(12) United States Patent
Paris et al.

(10) Patent No.: US 8,447,769 B1
(45) Date of Patent: May 21, 2013

(54) SYSTEM AND METHOD FOR REAL-TIME IMAGE COLLECTION AND SHARING

(75) Inventors: Sylvain Paris, Boston, MA (US); Paul E. Green, Cambridge, MA (US); Shmuel Avidan, Brookline, MA (US); William T. Freeman, Acton, MA (US); Wojciech Matusik, Lexington, MA (US)

(73) Assignee: Adobe Systems Incorporated, San Jose, CA (US)

( * ) Notice: Subject to any disclaimer, the term of this patent is extended or adjusted under 35 U.S.C. 154(b) by 181 days.

(21) Appl. No.: 12/868,490

(22) Filed: Aug. 25, 2010

Related U.S. Application Data

(60) Provisional application No. 61/248,208, filed on Oct. 2, 2009.

(51) Int. Cl.
*G06F 7/00* (2006.01)
*G06F 17/30* (2006.01)

(52) U.S. Cl.
USPC ............................................. 707/758

(58) Field of Classification Search
USPC .......................................... 707/758, 999.003
See application file for complete search history.

(56) References Cited

U.S. PATENT DOCUMENTS

| | | | |
|---|---|---|---|
| 7,363,258 B2 | 4/2008 | Svendsen et al. | |
| 7,461,094 B2 | 12/2008 | Morris et al. | |
| 2002/0069312 A1* | 6/2002 | Jones | 711/100 |
| 2004/0172419 A1* | 9/2004 | Morris et al. | 707/200 |
| 2004/0177116 A1 | 9/2004 | McConn et al. | |
| 2005/0172001 A1* | 8/2005 | Zaner et al. | 709/205 |
| 2009/0312033 A1* | 12/2009 | Shen et al. | 455/456.1 |

* cited by examiner

*Primary Examiner* — Aleksandr Kerzhner
(74) *Attorney, Agent, or Firm* — Wolfe-SBMC

(57) ABSTRACT

Various embodiments of a system and methods for real-time image collection and sharing are described. A group of geographically co-located mobile device users may capture images on the mobile devices during a session. The devices may send the images, during the same session, to a database where the images may be stored as a real-time image collection. The image collection may be shared, during the same session, among the mobile device users. The users may receive notification of new images in the image collection based on user preferences. The users may request, from the image collection, images containing particular content by identifying the content on an image and sending a search request which includes the identified content. A computation server may maintain a data set which associates similar images in the image collection. The data set may be updated for each new image that is added to the image collection.

20 Claims, 7 Drawing Sheets

SYSTEM AND METHOD FOR REAL-TIME IMAGE COLLECTION AND SHARING

PRIORITY INFORMATION

This application claims benefit of priority of U.S. Provisional Application Ser. No. 61/248,208 entitled "System and Method for Real-time Image Collection and Sharing" filed Oct. 2, 2009, the content of which is incorporated by reference herein in its entirety.

BACKGROUND

Digital photography provides several advantages over film for photographers. Two such advantages are the ability to capture a multitude of digital images with little or no added expense and the ability to share the digital images with other individuals who may have a particular interest in the subject matter of the digital images. Digital images are often shared, using conventional methods, via electronic means such as email or online photo-sharing sites. Such conventional methods provide limited capabilities for groups of individuals who wish to share photos. Typically, using conventional methods, an individual shares digital images by sending emails to other individuals and/or by uploading the digital images to a personal photo-sharing site. Individuals are likely to wait until after a particular event is completed to share photos of the event because conventional methods do not provide a convenient mechanism for sharing a large number of photos, in real-time, while attending an event.

Individuals attending the same event or visiting a same location may share an interest in images taken at the event or location. Accordingly, the individuals may wish to share, in real-time, while attending the event or location, images captured at the event or location. Conventional methods do not provide a convenient mechanism for groups of individuals at a same event or location to share digital images, as a group, in real-time, as the images are being captured. The individuals at an event or location may want to search for images, captured by other individuals at the event or location, which contain particular content from the event or location. The individuals at the event or location may also want to receive particular images captured at the event or location based on statistics for the images, such as statistics which indicate the most popular, or most highly ranked, images. Conventional methods do not provide a mechanism for creating a real-time image collection which enables individuals to retrieve images from the collection based on statistics or real-time image searches.

SUMMARY

A system and methods for creating a real-time, dynamic image collection which may be shared between multiple mobile device users is described herein. The mobile device users may be a group of mobile device users that are geographically co-located. For example, the mobile device users may be attending the same event or may be at the same geographic location. The mobile devices of the users may be connected to each other and to a central server via a wireless network. In some embodiments, the mobile device users may collectively build a real-time, shared image collection containing images captured by the mobile devices. The image collection may include images taken at the particular event or particular location at which the users are geographically co-located.

The mobile device users may capture images during a session and may send the images, via the wireless network, to the central server. The session may be a period of time during which the geographically co-located mobile device users may capture and share images. The images may be stored, during the session, in a database. The images stored in the database may be the real-time image collection. During the session, the images may be shared between the mobile device users of the group. The mobile device users may specify user preferences which may determine how the images in the real-time image collection are shared. Mobile device users may specify when to receive new images from the image collection and may also request to receive images containing particular content.

Figure 1:
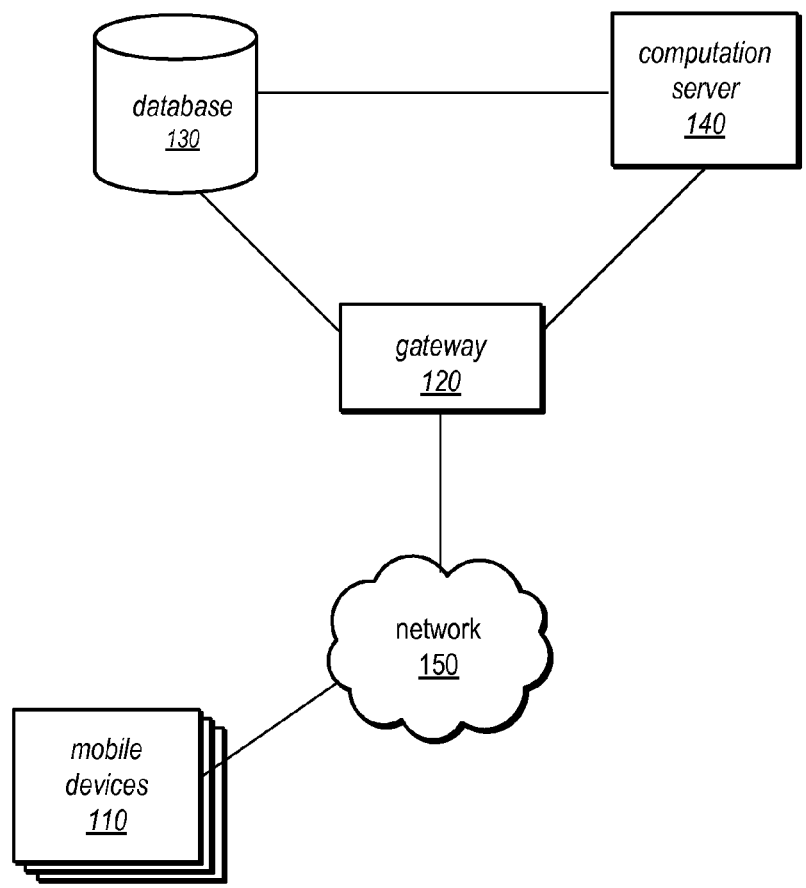
FIG. 1 illustrates a block diagram of an image-sharing system configured to implement the real-time collection and sharing of images, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (e.g., meaning having the potential to), rather than the mandatory sense (e.g., meaning must). Similarly, the words "include", "including", and "includes" mean including, but not limited to.

DETAILED DESCRIPTION OF EMBODIMENTS

Various embodiments of a system and method for real-time image collection and sharing are described. In the following description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the description may be presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

INTRODUCTION

A system and methods for creating a real-time, dynamic image collection which may be shared between multiple mobile device users is described herein. In some embodiments, the mobile device users may be a group of users that are geographically co-located. For example, the mobile device users may be attending the same event, such as a party, concert, wedding, etc. As another example, the mobile device users may be visiting the same location, such as a park, a tourist attraction, etc. The various mobile devices of the users may be connected to each other and to a central server via a wireless network. The mobile device users may, during a session, collectively build a real-time, shared image collection containing images captured by the mobile devices. The collection of images built by the mobile device users may include images taken at the particular event or particular location at which the users are geographically co-located. Thus, the mobile device users may share a common interest in the photo collection. The session may be a period of time during which the geographically co-located mobile device users may capture and share images.

The images captured by the geographically co-located mobile device users may be sent from the mobile devices to a central server. In other embodiments, the images may also be shared directly between mobile devices in the group before, after, or in parallel with the images being sent to the server. The images may be stored on the server for subsequent retrieval and sharing with the mobile device users within the group. The images may be shared in real-time between the mobile device users. For example, an image captured by a mobile device user in the group may trigger a notification which may inform other mobile device users within the group that a new image exists. As another example, a new photo captured by a mobile device user in the group may automatically be shared with other users within the group.

In some embodiments, images may be shared between mobile device users that have joined an image-sharing session. Images in the real-time image collection may be shared during an image-sharing session according to mobile device users' preferences. For example, mobile device users may choose to receive all new images captured during the session, images captured only by certain other mobile device users, images which contain particular content, or images which meet certain statistical criteria (e.g., most viewed images). Image-sharing sessions may be defined using various rules and access requirements for mobile device users. In other embodiments, users that are located remotely from the group of mobile device users that are capturing images may also join the image-sharing session. As a result, remote users who are not attending an event may also be able to experience the event by receiving real-time images captured by users that are attending the event.

Image-Sharing System

The system for real-time image collection and sharing may be referred to herein, for simplicity, as the "image-sharing system." FIG. 1 illustrates a block diagram of an image-sharing system configured to implement the real-time collection and sharing of images. While FIG. 1 illustrates a gateway 120, a database 130 and a computation server 140 as separate entities, the illustration is provided for example purposes only and is not meant to limit the configuration of the image-sharing system. In some embodiments, gateway 120, database 130 and computation server 140 may be implemented in the image-sharing system as separate systems, a single system, or any combination of systems.

As illustrated in FIG. 1, the image-sharing system may include a group of mobile devices 110. Mobile devices 110 may be an arbitrary number of mobile devices which may be capable of capturing digital images. Each mobile device in the group of mobile devices 110 may be configured to communicate, via a wireless connection, with each one of the other mobile devices in the group of mobile devices 110. Each one of the mobile devices 110 may also be configured to communicate, via a wireless connection, to a network 150, as illustrated in FIG. 1. The wireless connections of mobile devices 110 may be implemented within a wireless network such as a Bluetooth network or a wireless LAN.

As illustrated in FIG. 1, the image-sharing system may include gateway 120. Gateway 120 may be a web gateway which may be configured to communicate with other entities of the image-sharing system via wired and/or wireless network connections. As illustrated in FIG. 1, gateway 120 may communicate with mobile devices 110 via network 150. In various embodiments, gateway 120 may be connected to network 150 via a wired and/or wireless network connection. As illustrated in FIG. 1, gateway 120 may be connected to database 130 and computation server 140 of the image-sharing system. In various embodiments, gateway 120 may be connected to database 130 and/or computation server 140 via a wired or a wireless network connection.

Gateway 120 may be configured to send and receive data (e.g., images) to/from mobile devices 110. For example, gateway 120 may be configured to receive a new image from a mobile device and may send the new image to database 130 for storage in a real-time image collection. As another example, gateway 120 may be configured to send new images of the real-time image collection stored in database 130 to mobile devices 110. Gateway 120 may be configured to receive requests from mobile devices 110. For example, gateway 120 may receive an image search request from a mobile device and may query database 130 with the image search request. Gateway 120 may be configured to inform computation server 140 of new data. For example, gateway 120 may be configured to notify computation server 140 when a new image has been received from a mobile device and stored on database 130.

As illustrated in FIG. 1, the image-sharing system may include a database, such as database 130. Database 130 may be connected to gateway 120 and computation server 140 via wired and/or wireless connections. Database 130 may be configured to store a database of images (e.g., the real-time image collection) received from mobile devices 110 via network 150 and gateway 120. The database of images stored in database 130 may include image data, image descriptors which represent features of images and metadata which provides additional information about the images. Database 130 may also be configured to receive and service requests from gateway 120. For example, database 130 may receive, via gateway 120, an image search request from a mobile device and may service the image search request by providing, to gateway 120, images which meet the criteria specified in the image search request. Database 130 may be configured to communicate with computation server 140. For example, database 130 may receive, from computation server 140, updated metadata that tags a newly stored image in database 130 as a "new" image.

As illustrated in FIG. 1, the image-sharing system may include a computation server, such as computation server 140. Computation server may be connected to database 130 and gateway 120 via wired and/or wireless connections. As described above, computation server 140 may be notified, by gateway 120, of new images that have been added to the real-time image collection stored in database 130. Computation server 140 may be configured to send updated metadata for each new image to database 130 such that the metadata identifies the image as a new image in database 130. As described in further detail below, computation server 140 may be configured to maintain a data set which associates images of the real-time image collection that share similar image content. For example, for each new image that is stored in database 130, computation server 140 may compare the content of the new image to the content of existing images stored in database 130 to locate similarities in image content. Computation server 140 may store, in association with the new image, identifiers which indicate the similar images stored in database 130. Computation server 140 may update the data set for new images asynchronously to the storage of the new images in database 130 and may execute the data set updates as a background task or process.

Establishing an Image-Sharing Session

Multiple mobile device users may be geographically co-located (e.g. at a same event, such as a party, concert or wedding, or at a same location, such as a park or a zoo). The mobile device users may use the mobile devices to capture images of scenes, objects or individuals within the common geographic location. As described above, the mobile devices may be connected, via one or more wireless and/or wired networks, to a remote server. The images captured by the mobile device users may be sent, in real-time (e.g., as the images are captured), to the remote server. The remote server, for example, database 130, may store the set of images, thus forming a real-time image collection. The real-time image collection may be created by and shared among various ones of the geographically co-located mobile device users. An image-sharing session may determine a period of time during which a particular group of mobile device users (e.g., users that have joined the session) may capture and share images in real-time. In other embodiments, other users that are located remotely from the geographically co-located mobile device users may also join an image-sharing session and may share the real-time image collection.

In various embodiments, the image sharing system may enable a variety of different types of image-sharing sessions. In some embodiments, an administrator (such as an event organizer or a manager at a geographic location) may establish an image-sharing session. The administrator may determine which mobile device users are permitted to join a session, how the mobile device users are added to a session and the access privileges that mobile device users may have within a session. In other embodiments, a mobile device user may establish an image-sharing session. The mobile device user may determine which other mobile device users are permitted to join the image-sharing session, how the other mobile device users are added to a session and provide particular access privileges to the other mobile devices users within a session. In some embodiments, an administrator may establish one or more image-sharing sessions and mobile device users may also establish one or more image-sharing sessions.

An administrator that establishes an image-sharing session of mobile device users may determine which mobile device users are permitted to join the image-sharing session. The administrator may determine that all mobile device users that are geographically co-located (e.g., attending a same event or within a same geographic location) may be permitted to join an image-sharing session. Various embodiments of the system for real-time image collection and sharing may use a variety of methods for determining that mobile device users are geographically co-located. For example, geographically co-located mobile device users may be determined according to the geographic coordinates of the mobile device users. For example, the geographic coordinates of a mobile device user may be determined by a global positioning system (GPS) device integrated in the user's mobile device. The administrator may determine that any mobile device users within a certain range of particular geographic coordinates may be permitted to join an image-sharing session. Accordingly, a mobile device user who enters an event or geographic location, thereby entering the particular range of geographic coordinates, may be permitted to join the image-sharing session.

As another example, the range of a wireless network may be used to determine that mobile device users are geographically co-located. A wireless network, such as a Bluetooth network or wireless LAN may be established at an event or location. Mobile device users which attend the event or location may come within range of the wireless network, such that the mobile devices may be connected to the wireless network. The administrator may determine that a user of a mobile device which enters the range of the wireless network may be permitted to join an image-sharing session. As yet another example, arrival at an event or location may be used to determine that mobile device users are geographically co-located. Mobile device users that enter an admissions gate or door at an event or a location, such as at a concert or at a zoo, may be considered attendants to the event. The administrator may determine that mobile device users who enter an event may be permitted to join an image-sharing session at the event.

In some embodiments, rather than determining that all geographically co-located mobile device users are permitted to join an image-sharing session, an administrator may choose restrict the image-sharing session to particular mobile device users that are geographically co-located. The administrator may specify one or more criteria that mobile device users must meet to be eligible to join the image-sharing session. For example, the administrator may specify that a mobile device user must pay a fee to be eligible to join an image-sharing session. As another example, the administrator may specify that a mobile device user must be a member of a particular group (e.g., a season pass holder at an amusement park) to be eligible to join and image-sharing session. Accordingly, the system may first determine, using one or more of the methods described above, mobile device users which are geographically co-located. The system may then determine which of the geographically co-located mobile users meet the criteria required by the administrator for eligibility to join the image-sharing session. Mobile device users that are geographically co-located and eligible for an image-sharing session may join the image-sharing session. In other embodiments, an administrator may determine that other users, who are not geographically co-located may also be eligible to join the image-sharing session. In such embodiments, the other users may access the image-sharing session via a wireless, LAN, or other network, and may, for example, gain access to the image-sharing session by entering a username and/or password for authentication, as determined by the administrator.

An administrator may determine the manner in which mobile device users may join an image-sharing session. As an example, mobile device users may be automatically connected to the image-sharing session when they enter an event or geographic location, or when their mobile device is discovered, for example, within the particular coordinates of a geographic location. As another example, mobile device users may be invited to join an image-sharing session when they enter an event or geographic location. In such an example, an alert, or invitation, may be displayed on the mobile device and may provide instructions for joining the image-sharing session.

In some examples, an image-sharing session may be secure and may require authentication before a user may join the session. A mobile device user may create a username and password upon joining the image-sharing session. In other embodiments, a username and password may be provided to a user prior to the event or prior to the user visiting the geographic location. For example, a notice describing the image-sharing session may be provided along with a ticket purchased for the event or location. The notice may describe the image-sharing session and may provide instructions for a mobile device user to join the image-sharing session during the event, or at the location. The notice may also provide a username and/or password which may be used to join the session. In some embodiments, a mobile device user may be requested to change the provided username and password upon joining the session. An administrator may also decide whether to charge a fee for joining an image-sharing session. Such a fee may be paid by a mobile device user, for example, during a ticket purchase for the event or location, or upon joining the image-sharing session, via an electronic transaction between the mobile device and the remote server, or via a financial transaction through another means.

Mobile device users which join an image-sharing session may have various access privileges within the image-sharing session. As an example, all mobile device users which join an image-sharing session may have access to all of the features of the image-sharing session. As another example, the access privileges may be tiered dependent on user fees paid for access to the image-sharing session. For example, a user that pays the top fee of the tiered system may be granted all access privileges. Such a user may be able to send and receive images to and from the image-sharing session and may be able to set up private image-sharing sessions with friends. A user that pays the lowest fee may only be able to receive images within the image-sharing session. As yet another example, different types of users within the image-sharing session may have different access privileges. In such as an example, a user such as a professional photographer at a wedding may have access for sending and receiving images while guests at the wedding may only have access privileges for receiving images taken by the professional photographer at the wedding.

In some embodiments, an administrator may place a time limit on an image-sharing session. The administrator may establish a particular beginning and end time for the image-sharing session, or the administrator may specify the image-sharing session is to be open for a particular number of hours. For example, an administrator may determine that an image-sharing session may be active from the beginning of a concert to the end of the concert. As another example, the administrator may determine the timing of an image-sharing session may coincide with the opening and closing hours of an amusement park.

Mobile device users that are geo-graphically located may also establish image-sharing sessions. For example, a mobile device user may establish an image-sharing session with other mobile device users (e.g., friends) that are also at an event or a geographic location. A mobile device user may establish the membership of the image-sharing session prior to the event, for example, by specifying other mobile device users that may be connected to the image-sharing session when they enter the event or location. As another example, a mobile device user may establish an image-sharing session during an event and may send invitations to join the image-sharing session to friends who are attending the event. The mobile device user may request to be notified when other mobile device users that are in the mobile device user's address book are present at the event. Upon receiving such a notification that another mobile device user is present at the event, the mobile device user may decide whether to send an invitation to the other mobile device user to join the image-sharing session.

In some embodiments, a mobile device user may initialize a photo-sharing session and other mobile device users may join the session. In some embodiments, mobile device users may be authenticated using a login and password before gaining access to the session. In such an example, the mobile device user that initiated the session may determine which other mobile device users may be permitted to access the session. In another example, default, or implicit sessions may be defined by mobile device users: a mobile device user may, for example, establish a rule such as, "always share my photos with friend A." As another example, an event organizer may set up a session and any mobile device user attending the event may have an option to join the session. In some embodiments, users attending an event may pay a fee before gaining access to a photo-sharing session. As yet another example, invitations to join a session may be trigger by a GPS mechanism. In this example, a mobile device user may be invited to join a session when the GPS coordinates of the user's mobile device indicate that the mobile device user is at particular location (e.g. attending a particular event). In another example, the system may determine that a mobile device user's friends (e.g. contacts in the user's mobile device) are geographically co-located with the mobile device user and may invite the friends to join a photo-sharing session with the mobile device user.

The system for real-time image collection and sharing may support any combination of the above-described image-sharing sessions. In embodiments where multiple image-sharing sessions may be simultaneously active at a particular event or geographic location, each active image-sharing session may be distinguished from other active image-sharing sessions, such as with a unique identifier. The unique identifier for an image-sharing session may be sent as part of all communications between a mobile device user and the remote server for a particular image-sharing session to designate that the communications are associated with the particular image-sharing session.

Image Capture

Figure 2:
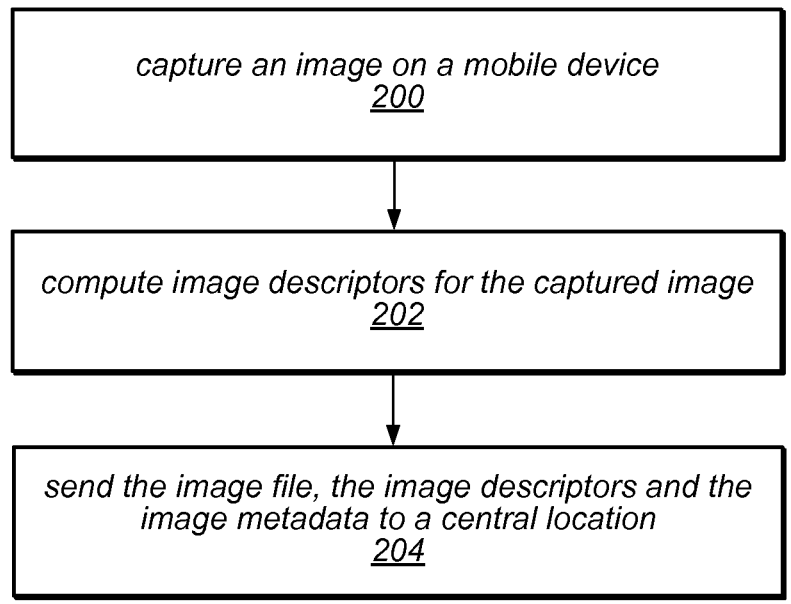
FIG. 2 illustrates a method that may be implemented on a mobile device to capture an image and send the image to a central location to be shared during an image-sharing session, according to some embodiments.

As described above, geographically co-located mobile device users may use their mobile devices to capture images. The mobile devices may send the images to a central location, such as database 130. The images sent to a central location may be a collection of images that may be shared by all of the geographically co-located mobile device users that are members of an image-sharing session. FIG. 2 illustrates a method that may be implemented on a mobile device to capture an image and send the image to a central location, such as database 130, such that the image may be shared during an image-sharing session.

The method illustrated in FIG. 2, may include, as indicated at 200, capturing an image on a mobile device. A mobile device (e.g., a mobile phone with an integrated digital camera) may capture an image by recording the image via an electronic image sensor and storing the data which represents the image. Examples of other mobile devices that may be used to capture images may be, but are not limited to, digital cameras, personal digital assistants (PDAs), tablet computers and video cameras. The captured image may be a digital image. Examples of digital images may include, but are not limited to, still frame images captured by a digital camera or video frames extracted from a digital video sequence. Digital image file types may include, but are not limited to Joint Photographic Experts Group (JPEG) files, Graphics Interchange Format (GIF) files, Tagged Image File Format (TIFF) files, or Portable Network Graphics (PNG) files.

Capturing an image on a mobile device may also include creating metadata for the captured image. Metadata for an image may be data that is descriptive of the image. For example, metadata may be a timestamp that specifies a date and a time at which an image is captured. Metadata may also be a location (such as a geo-tag), determined by a global positioning system (GPS) receiver of the mobile device, that specifies the geographic location at which an image is captured. Metadata may also be a tag, or name, attached to an image by the photographer that captured the image. Metadata may be embedded in an image file which contains the image data. Some metadata, such as a timestamp, may automatically be included in an image file when the image is captured by a mobile device. Metadata may also be stored in a dataset associated with the image file. The metadata may be saved under various standard metadata formats, such as exchangeable image file format (EXIF) type metadata, IPTC type metadata, XMP type metadata, or other types of metadata.

As indicated at 202, the method illustrated in FIG. 2 may include computing one or more image descriptors for the captured image. An image descriptor may describe a "region of interest" (e.g., a particular distinctive feature) of an image. As an example, an object depicted in an image may have various features which distinguish the object from other objects either in the same image or in other images. The portion of an image which contains such distinguishing features of an object may be a region of interest of the image. For example, the eyes on a face depicted in an image may have features which may help distinguish the face from other faces, which may, in turn, help distinguish a person in an image from other persons in the same image or in other images. Accordingly, the region of an image which includes the eyes of a face may be considered a region of interest of the image. Regions of interest of an image may not be limited to regions which specifically include features of objects depicted in the image, but, rather, may be any regions which contain distinguishing features of the image. An image descriptor may be computed for each region of interest of an image.

The image descriptors computed for an image may be used, as described in further detail below, to locate similar images (e.g., images which contain similar content, such as, scenes, people, and/or objects) in database 130. The similar images may be located by comparing image descriptors for a source image to the image descriptors of images in database 130. Image descriptors may provide a more effective image search mechanism than a pixel to pixel comparison between images. For example, an image descriptor may still locate the same person in two different images, even if the person is in a different location in the two images. A pixel to pixel comparison of the two images may not locate the person in both images, as the pixels may be significantly different between the images due to the movement of the person between the two images.

Images may be captured under a variety of different conditions. For example, camera parameters, such as focal length, zoom settings, and/or lens distortion may vary between different images, particularly between images captured by different cameras and/or different photographers. As another example, environmental conditions, such as lighting, camera position/angle, and/or object occlusions may vary between different images. Effectively locating similar images within a set of images may require an accurate comparison of the content of the images, regardless of any camera parameters or environmental conditions that may be different between the images.

For example, two images which contain the same object should be identified as containing similar content, even if one of the images is captured at a 1× magnification level and the other image is captured at a 10× magnification level. As another example, lighting effects may differ significantly between two images. One image of a person may be captured outside, under sunny conditions, while another image of the person may be captured inside, under dark conditions. A user may wish to search for all images that contain a particular person, regardless of the environment conditions under which the images of the person were captured. To effectively locate all images containing similar content, a search mechanism may require image descriptors that accurately capture image regions of interest and are invariant to different parameters and/or conditions under which images was captured.

A mobile device may execute various algorithms for computing image descriptors for a captured image. In one embodiment, a mobile device may execute a scale-invariant feature transform (SIFT) algorithm to compute image descriptors for a captured image. The SIFT algorithm may detect regions of interest of an image and may compute an image descriptor which may be a signature of the characteristics of each region of interest. The SIFT algorithm may identify and compute descriptors for regions of interest of an image and may be invariant to various image parameters and environmental conditions such as image scale, illumination, local geometric distortion and/or the presence of clutter, noise, and/or partial occlusions in an image. Accordingly, the SIFT image descriptors may be invariant to image translation, scaling, rotation, illumination, and various environmental conditions.

In another embodiment, a mobile device may execute a speeded-up robust features (SURF) algorithm to compute image descriptors for a captured image. The SURF algorithm may detect regions of interest in an image and may compute an image descriptor which may describe the characteristics of each region of interest. The SURF algorithm may be based on sums of approximated 2D Haar wavelet responses within the neighborhood of an interest point. The SURF algorithm may rely on integral images to reduce computation time in computing image convolutions. In some embodiments, the SURF algorithm may provide require less computation time than the SIFT algorithm in calculating image descriptors. SURF image descriptors may also be invariant to image translation, scaling, rotation, illumination, and various environmental conditions.

An image descriptor, whether a SIFT descriptor, a SURF descriptor, or a descriptor obtained from some other algorithm, may be implemented as a vector. Each image descriptor may be a vector signature of a point of interest (e.g., a distinguishing object feature) on an image. A single captured image may be associated with multiple image descriptors, or vectors, with each vector representing the characteristics of a point of interest on the image. An image descriptor vector may be a set of elements, with each element associated with a particular characteristic of an image region. Each element of an image descriptor vector may store a numerical value which characterizes the particular characteristic with which the element is associated. For example, one element of an image descriptor vector may be associated with the color of a region of interest of an image and may contain a numerical value which characterizes the color histogram of the region of interest. In some embodiments, a typical size of an image descriptor vector may be 100 dimensions (e.g., 100 numbers).

As indicated at 204, the method illustrated in FIG. 2 may include sending the image file, image descriptors and image metadata to a central location. The central location may be a server, such as database 130, where the image file, image descriptors and image metadata may be stored. In some embodiments, the mobile device may include, along with the image file, descriptors and metadata, a request to store the image file, descriptors and metadata. The request may be, for example, an HTTP request. In other embodiments, the mobile device may use various other formats for the request. In alternate embodiments, the image file, or the image file and image metadata may be sent to the central location, without the image descriptors. In such embodiments, the image descriptors may be computed, using a method similar to that described above, by an entity other than the mobile device. For example, the image descriptors may be computed by the server on which the image file and image descriptors are stored. In some embodiments, the image data, descriptors and metadata may be embedded in a single image file and the image file may be sent.

Image Collection and Sharing

Figure 3:
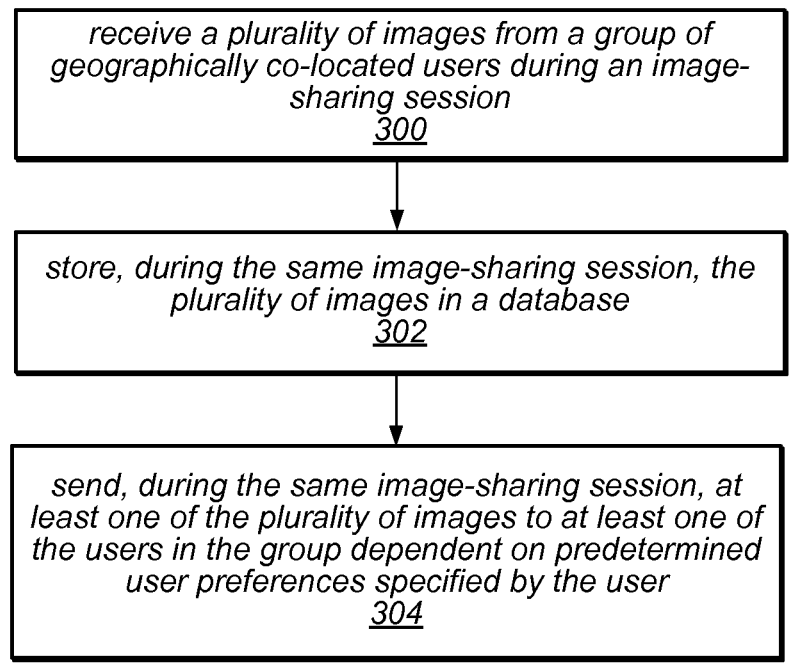
FIG. 3 illustrates a method that may be implemented by the image sharing system to collect and share, during a session, multiple images captured by a group of geographically co-located mobile device users, according to some embodiments.

As described above, geographically co-located mobile device users may use their mobile devices to capture and send, during a session, images to a central location for sharing with other mobile device users. FIG. 3 illustrates a method that may be implemented by the image sharing system to collect and share, during a session, multiple images captured by a group of geographically co-located mobile device users. As described above, a session may be period of time during which a group of mobile users may capture and share images. As indicated at 300, the method may include receiving a plurality of images from a group of geographically co-located users during an image-sharing session. The images captured by the mobile device users during an image-sharing session and sent to a central location during the same image-sharing session may be received, via network 150, by web gateway 120. Web gateway 120 may receive image data, image descriptors and metadata for each of the multiple images captured by the mobile device users during the image-sharing session. As described above, the image data, descriptors and metadata may be embedded in a single image file, or may be separate data entities. For simplicity, the set of data representing an image (image data, descriptors and metadata) is referred to herein as an "image file." Web gateway 120 may send the received image file(s) to database 130.

As indicated at 302, the method illustrated in FIG. 3 may include storing, during the same image-sharing session, the plurality of images in a database. For example, the image sharing system may store each received image file in database 130. As part of storing an image file in database 130, the image sharing system may designate the image file as "new." For example, a tag may be added to the image file to designate the image file's "new" status in the database. Alternatively, a particular location (e.g., a bit or other data element) in the image file may be used to designate the image file's "new" status in the database. Such a location may be a part of the image metadata, or may be elsewhere in the image file.

A unique image identifier may be assigned to each new image file stored in database 130. The unique image identifier may distinguish the image from all other images stored in the database. Unique image descriptor identifiers may be assigned to each image descriptor associated with a new image file. The unique image descriptor identifiers may distinguish each image descriptor from all other image descriptors stored in the database. In some embodiments, an image descriptor identifier may be an extension of the identifier assigned to the image file with which the image descriptor is associated. For example, an identifier of an image file may be 100 and the identifiers of the image descriptors associated with the image file may be sequentially ordered as 100.1, 100.2, 100.3, and so forth. In other embodiments, other numbering schemes may be used for unique image file and image descriptor identifiers. An image descriptor identifier may sufficiently identify a particular descriptor without any additional information. Accordingly, only the identifier for an image descriptor may need to be sent when transmitting descriptor information, rather than transmitting the entire descriptor.

As indicated at 304, the method illustrated in FIG. 3 may include sending, during the same session, at least one of the plurality of images to at least one of the users in the group dependent on predetermined user preferences specified by the user. As described above, a group of geographically co-located mobile device users that are participating in an image-sharing session may share images which are captured during the image-sharing session. As described in further detail below, the mobile device users participating in the image-sharing session may specify preferences which determine how the images are shared. More specifically, the user-specified preferences may indicate the type of images that a user would like to receive during the image-sharing session. Based on preferences that a mobile device user has specified for an image-sharing session, the image-sharing system may send images from the real-time image collection to the mobile device user during the image-sharing session. In some embodiments, the images may be sent as image thumbnails.

The image thumbnails may be displayed on the user's mobile device. The mobile device user may select a thumbnail to view, or download from the server and view, the image represented by the thumbnail.

The image sharing system may provide multiple mechanisms by which a mobile device user may specify preferences for image sharing. A mobile device user may specify preferences prior to joining an image-sharing session, or even prior to the establishment of an image-sharing session. For example, a mobile device user, when buying a ticket for a particular event (e.g., a concert) may indicate a desire to participate in an image-sharing session during the event and may also specify preferences for images that the mobile device user would like to receive during the event. Accordingly, when the mobile device user attends the event and joins the image-sharing session (e.g., via a login and authentication process), the mobile device user's preferences have already been established and are known by the image sharing system.

A mobile device user may also specify preferences when joining an image-sharing session. For example, when a mobile device user joins an image-sharing session for the first time, the image-sharing system may request that the mobile device user specify preferences. The mobile device user may specify preferences while joining the image-sharing session, or may decline the request and elect an option to establish preferences at some point later in the image-sharing session. A mobile device user may establish new image sharing preferences, or change existing image sharing preferences at any time during an image-sharing session. As described above, remote users, who are not geographically co-located may also be eligible to join an image-sharing session and gain access to the real-time image collection. The remote users may also be able to establish image-sharing preferences. For example, a remote user may log in to the real-time image sharing system and access a user interface that may allow the user to specify particular image-sharing preferences.

A mobile device user may specify a variety of different image sharing preferences which may determine the type of images that are shared with the mobile device user, how such images are shared with the mobile device user and when such images are shared with the mobile device user. A mobile device user may specify, as part of the user preferences, image criteria that indicate the various characteristics of images that the mobile device user would like to receive during an image-sharing session. During the image-sharing session, the image sharing system may send, to the mobile device user, images with characteristics that match the user-specified image criteria.

The image criteria specified by a mobile device user may indicate, for example, that the mobile device user would like to receive all new images that are captured during an image-sharing session. A "new" image may be an image that has been received in the database of the image sharing system, but has not yet been sent to the mobile device user. In response to user preferences which indicate that a mobile device user would like to receive all new images captured during an image-sharing session, the image-sharing system may send each new image to the mobile device user. As described in further detail below, the mobile device user may indicate (e.g. as part of the user preferences) how and when images should be send to the user's mobile device.

Other image criteria that may be specified by a mobile device user may indicate characteristics of the image metadata. As described above, image metadata may include data such as timestamp, geo-tag, ranking, name, photographer, various camera parameters, and/or other data that is descriptive of the image. The image criteria of a mobile device user's preferences may indicate that the mobile device user would like to receive images with a particular timestamp. For example, a mobile device user may want images taken during a particular timeframe, or before and/or after a particular point in time. The image criteria may, as another example, indicate that the mobile device user would like to receive images which have been highly ranked by other mobile device users within the image-sharing session. As described below, mobile device users may assign various rankings or ratings to images captured during an image-sharing session. The rankings or ratings may be saved as part of the metadata for an image. As yet another example, the image criteria may indicate that the mobile device user would like to receive images captured by a particular photographer, or a particular geographic location (as may be indicated by a geotag included in the metadata of an image).

The image criteria specified by a mobile device user may indicate that the mobile device user would like to receive images which contain a particular type of content. For example, a mobile device user may indicate that they would like to receive all images in which they appear, or, as another example, all images in which the guitar player in a band appears. The mobile device user may specify the desired image content and send one or more identifiers of the image content, via the user's mobile device, to gateway 120. The image sharing system may then locate, in database 130, images that contain content similar to the mobile device user's indicated desired content. The located images may be sent to the mobile device user, according to the user's specified preferences for receiving images.

A mobile device user may specify image content by indicating the content on an image that already exists on the user's mobile device. As described in further detail below, a mobile device user may indicate desired content on an image by interacting with a touch screen of the mobile device to "select" the desired content. For example, the mobile device user may circle, tap, or scribble across the desired content on a display of the image which includes the desired content. The user's mobile device may locate, or calculate, one or more image descriptors that are associated with the content specified by the mobile device user and may send the image descriptor(s) to gateway 120.

A mobile device user may also specify desired image content by providing a textual input which names the desired content. For example, a mobile device user may type in a description of the desired content, such as "guitar player." As another example, a mobile device user may select, via a user interface on the user's mobile device, content from a content menu, or list, which is provided on the user's mobile device. The image sharing application on the user's mobile device may provide a content selection menu which includes a predetermined list of content items that are expected to be popular, or common, objects of images captured at the event. For example, the image sharing application, for an image-sharing session at a concert, may provide a content selection menu which contains content items such as, "guitar player," "lead singer," and/or "drummer." As described in further detail below, the image-sharing system may store received images which contain the various predetermined content items in association with the names of the predetermined content items. Accordingly, the image-sharing system may send received images which are associated with a particular predetermined content item name to a mobile device user. Embodiments of the image-sharing system may enable a user to specify any combination of the above-described image criteria.

A mobile device user may choose to receive image notifications or actual image files. A mobile device user that has chosen to receive image notifications may be informed, via the user's mobile device, when images which match the mobile device user's specified image criteria are added to the real-time image collection. The notification may be sent to the mobile device of the user by gateway 120. The mobile device user may elect to receive a notification each time an image of interest is added to the real-time image collection, or may elect to receive periodic (e.g., occurring at regular time intervals) notifications of images of interest that have been added to the real-time image collection over a particular time period. The mobile device user may specify a desired frequency of image notifications as part of the user preferences. Upon receiving an image notification, the mobile device user may decide whether to receive the actual image. The mobile device user may request an actual image by responding to the image notification.

A mobile device user that has chosen to receive actual images may receive each new image of interest that is added to the real-time image collection during an image-sharing session. The mobile device user may elect to receive each new image as the image is added to the real-time image collection, or may elect to receive, on a periodic basis, a stream of new images that have been added to the real-time image collection. A mobile device user may also choose not to automatically receive images or image notifications. For example, a mobile device user may specify in the user preferences that the mobile device user will initiate a request for desired images. In such an example, the image-sharing system may not send any automatic notices to the mobile device user, until such notices are requested by the mobile device user. All of the above-described image notification preferences may be specified by the mobile device user, as part of the user preferences, either before or during an image-sharing session.

Nearest Neighbor Table

Figure 4:
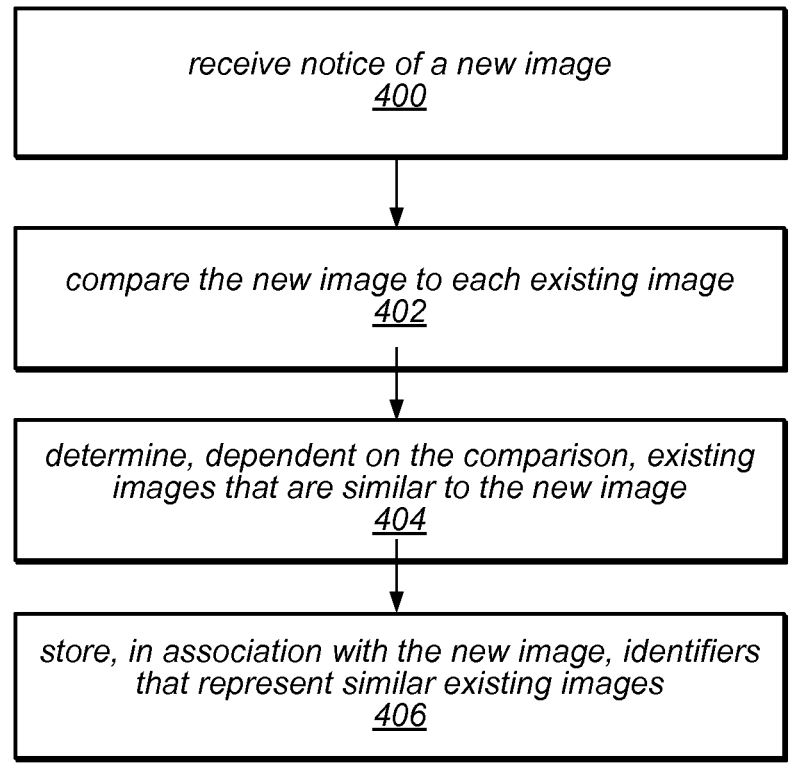
FIG. 4 illustrates an example method for establishing a nearest neighbor table which stores information to associate similar images, according to some embodiments.

Computation server 140 may determine, for each new image stored in database 130, existing images in database 130 that are similar to a new image that has been stored in database 130. Computation server 140 may establish a data set (e.g., a table) which stores information that associates similar images which are stored in database 130. The data set is referred to herein as a "nearest neighbor table." Note that in other embodiments, data set types other than tables may be used to store similar image information. FIG. 4 illustrates an example method that may be implemented by computation server 140 to establish a nearest neighbor table which stores information to associate similar images of database 130. The nearest neighbor table may be used by the image sharing system to retrieve similar images from database 130. For example, the image sharing system may use the nearest neighbor table to retrieve images that include content which is similar to desired image content that has been identified by a mobile device user.

As indicated at 400, the method illustrated in FIG. 4 may include receiving notice of a new image. For each new image stored in database 130, gateway 120 may provide notice of the new image to computation server 140. For example, gateway 120 may send, to computation server 140, the unique identifier of each new image and/or the unique identifiers of the image descriptors of the new image. As indicated at 402, computation server 140 may compare the new image to each existing image that is stored in database 130. To compare a pair of images (e.g., a new image and an existing image), computation server 140 may compare the image descriptors of the two images. From the comparison of the image descriptors of the two images, computation server 140 may compute a distance between the pair of images.

Computation server 140 may, in various embodiments, use a variety of algorithms to compute a distance between a pair of images (e.g., a new image and an existing image). As an example, computation server 140 may compute a Euclidean distance between a pair of images, dependent on a comparison of the image descriptors of the pair of images. To compute the Euclidean distance between a pair of images, computation server 140 may first compute a distance between each image descriptor of the new image and each image descriptor of the existing image. As described above, an image descriptor may be a vector with multiple elements. Each element of the image descriptor may store a numerical value which represents a particular characteristic of a region of interest of an image. Computation server may use the numerical values of corresponding elements of a pair of image descriptors to compute a Euclidean distance between the pair of image descriptors.

The Euclidean distance ($d_{ij}$) between a new image descriptor i and an existing image descriptor j may be computed as in equation (1):

$$d_{ij} = \sqrt{\sum_{k=1}^{n} (x_{ik} - x_{jk})^2} \quad (1)$$

for n number of elements x. For example, computation server 140 may compute the square of the difference between the numerical values of each pair of corresponding elements of a pair of image descriptor vectors. Computation server 140 may then compute a sum of all of the squared differences. Computation server 140 may then compute the square root of the sum to determine the Euclidean distance between the pair of image descriptors. Computation server 140 may repeat the Euclidean distance calculation to determine a distance between each new image descriptor and each existing image descriptor. The result of the Euclidean distance calculations may be a set of distance values which represent the distances between the image descriptors of the new image and the image descriptors of the existing image.

As indicated at 404, the method illustrated in FIG. 4 may include determining, dependent on the comparison of a new image to the existing images, existing images that are similar to the new image. Computation server 140 may use the distance values between image descriptors, calculated as described above, to determine existing images that are similar to a new image. Computation server 140 may, in various embodiments, use a variety of different algorithms to determine, based on the calculated distance values, which of the existing images may be considered similar to a new image.

For example, computation server 140 may determine a certain number of nearest neighbors of a new image, or an N number of existing images that are most similar to a new image. To determine the N nearest neighbors of an image, computation server 140 may select the N existing images with image descriptors that are closest in distance to the new image. In some embodiments, computation server 140 may sum, average, or otherwise mathematically combine the distance values calculated between a new image and an existing image. Computation server 140 may determine that the N existing images with the lowest combined distance values are the N nearest neighbors of the new image. In other embodiments, computation server 140 may determine the N nearest neighbors of a new image based on a number of image descriptors which have distance values that are below a particular threshold. Computation server 140 may set a particular distance value threshold and may determine, for each existing image, a number of image descriptors which have a distance value that is below the threshold. Computation server 140 may then determine that the N existing images with the most image descriptors having distance values below the threshold are the N nearest neighbors.

Computation server 140 may also determine similar images based on a comparison of new image metadata to existing image metadata. For example, computation server 140 may compare the timestamps of a new and existing image pair to determine whether the two images were captured within a particular time period. If the difference between the time stamps is under a particular threshold, the images may be considered to have similar timestamps. As another example, computation server 140 may compare the geo-tags of a new and existing image pair to determine whether the two images were captured at a same location, or within a particular distance range. If the distance between the geographic coordinates of the geo-tags of the images is below a particular threshold, computation server 140 may determine that the images where taken at a similar location.

As indicated at 406 of FIG. 4, the method for establishing a nearest neighbor table may include storing, in association with a new image, identifiers that represent similar existing images. As described above, each new image and each existing image in database 130 may be represented by a unique identifier. Based on the nearest neighbor images determined as described above at 404, computation server 140 may store the identifiers of a new image's nearest neighbors in association with the new image. For example, computation server 140 may create a nearest neighbor table. The nearest neighbor table may associate the identifier of a new image with the identifiers of the image's nearest neighbors. The nearest neighbor table may serve as a look-up table for locating images that are similar to a particular image. Note, that in other embodiments, computation server 140 may associate similar images using methods, or data set types, other than a nearest neighbor table.

In some embodiments, computation server 140 may periodically update (as new images are stored) the nearest neighbor table asynchronously using the new images stored in database 130. Computation server 140 may be informed of each new image in database 130, but may not update the nearest neighbor table with the new image in direct response to the new image notice. Rather, computation server 140 may periodically perform asynchronous updates to the nearest neighbor table to include new images. For example, computation server 140 may wait to receive notice that a certain number of new images have been stored in database 130 before performing an update to the nearest neighbor table (using the method illustrated in FIG. 4). As another example, computation server 140 may periodically perform updates to the nearest neighbor table according to certain time intervals. Computation server 140 may wait a certain amount of time after performing an update to the nearest neighbor table to perform another update to the nearest neighbor table for any new images that may have been stored in database 130 during the time interval. In some embodiments, computation server 140 may perform updates to the nearest neighbor table as a background process. For example, computation server 140 may perform updates to the nearest neighbor table in the background when system resources are readily available.

Content-Based Image Search

Figure 5:
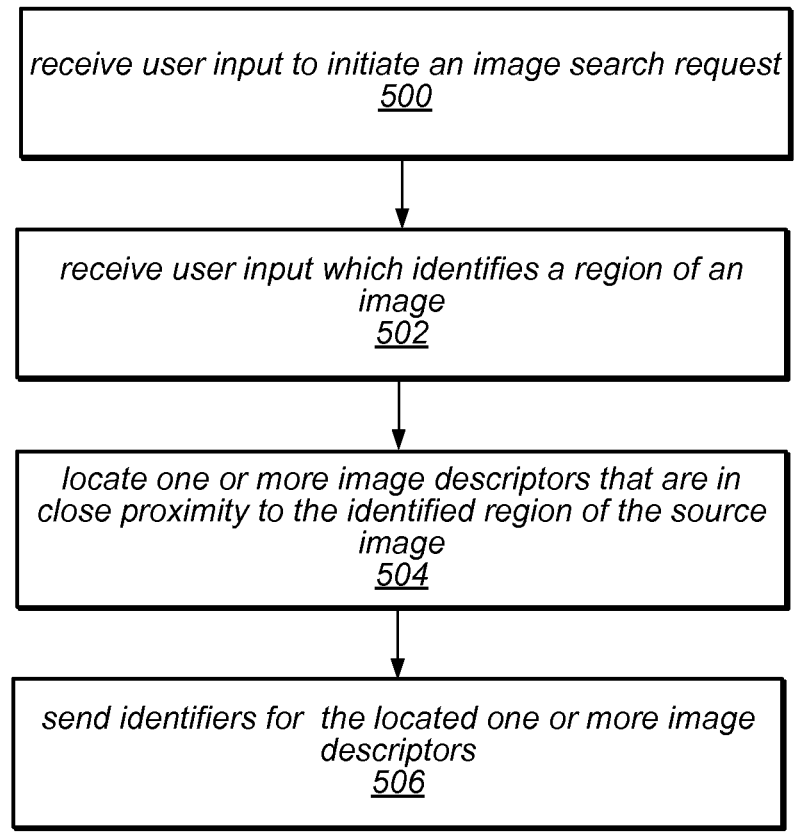
FIG. 5 illustrates an example method for requesting, from a mobile device, a content-based image search, according to some embodiments.

A mobile device user participating in an image-sharing session may wish to request images which contain content that is of interest to the mobile device user. For example, a mobile device user attending an event may have captured an image of a particular person or object at the event and may wish to see other images of the same person or object that have been capture by other mobile device users attending the same event. Accordingly, the mobile device user may send, via the user's mobile device, an image search request to the image sharing system. The image search request initiated by the mobile device user may be a request that is in addition to, or separate from, the mobile device user's subscription for image updates. FIG. 5 illustrates an example method for requesting, from a mobile device, a content-based image search. Such a method may be executed, for example, by an image-sharing application executing on a mobile device. The method illustrated in FIG. 5 may include, as indicated at 500, receiving user input to initiate an image search request. A user may initiate, via the user interface of the image-sharing application executing on the user's mobile device, an image search request.

As indicated at 502, the method illustrated in FIG. 5 may include receiving, on a mobile device, user input which indentifies a region of an image. A mobile device user may select, on the user's mobile device, a source image. The source image may contain image content (e.g., reference content) which the user would like to locate in other images that may be stored in the real-time image collection. The mobile device user may identify, on a display of the source image on the user's mobile device, reference content which may be the subject of the image search. The reference content may be the entire source image or may be a portion of the source image that is less than the source image.

In some embodiments, the mobile device user may identify the reference content by applying a touch gesture to the touch sensitive display of the user's mobile device. The mobile device user may identify reference content that is a portion of a source image by executing a touch gesture on or near the reference on the display of the source image. For example, the mobile device user may identify the reference content by touching a point close to the reference content, circling (or otherwise indicating a boundary around) the reference content, scribbling across the reference content, or using various other touch gestures which may indicate the source image region that contains the reference content. The mobile device user may also identify an entire source image as reference content for an image search. For example, the mobile device user may touch a thumbnail of the source image to identify the entire source image as reference content for the image search. In other embodiments, user identification of reference content for an image search may include user input other than touch gestures applied to a touch-sensitive display. For example, a mobile device user may identify reference content that is a portion of a source image by selecting the reference content using various movements of an input pointing device, such as clicking on or drawing a boundary around the reference content.

As indicated at 504, the method illustrated in FIG. 5 may include locating one or more image descriptors that are in close proximity to the identified region of the source image. As described above, the image-sharing application executing on a mobile device may, for each captured image, compute a set of image descriptors which describe various "regions of interest" (e.g., distinctive features) of the image. The locations of the image regions represented by existing image descriptors for a source image may be evaluated to find the image descriptors that are in close proximity to the user identified region of the source image. The location of an image region represented by an image descriptor may be a coordinate position of the region on the image. As an example, each image descriptor may be represented by a set of x,y coordinates which describe the location of the image descriptor on the image. The image-sharing application executing on the mobile device may, in various embodiments, use a variety of different algorithms to determine image descriptors that are in close proximity to the reference content identified by the mobile device user.

As an example, the image-sharing application executing on the mobile device may compare the position (e.g., x,y coordinates) of the mobile device user's selected region on the image to the position(s) of the descriptor(s) stored for the image. The image-shared application executing on the mobile device may locate the descriptor(s) having position(s) closest to the mobile device user's selected region. The image-sharing application may determine the single image descriptor that is closest to the user selected region, or the image-sharing application may find the N number of image descriptors that are closest to the user selected region. As another example, the image-sharing application may determine all image descriptors within a certain distance of the user selected region. As indicated at 506, the method illustrated in FIG. 5 may include sending the identifiers for the located one or more image descriptors. The image-sharing application may send, to database 130, identifiers for the image descriptor(s) located using a process similar to that described above. In other embodiments, the image-sharing application may also send an identifier of the source image to database 130. The image-sharing application may send the identifiers as part of a request to search for images which contain content which is similar to the image content identified by the image descriptors. As described in further detail below, the database server may be configured to use the identifiers to locate images with content similar to the user selected region of the source image and send the located images to the user's mobile device.

Figure 6:
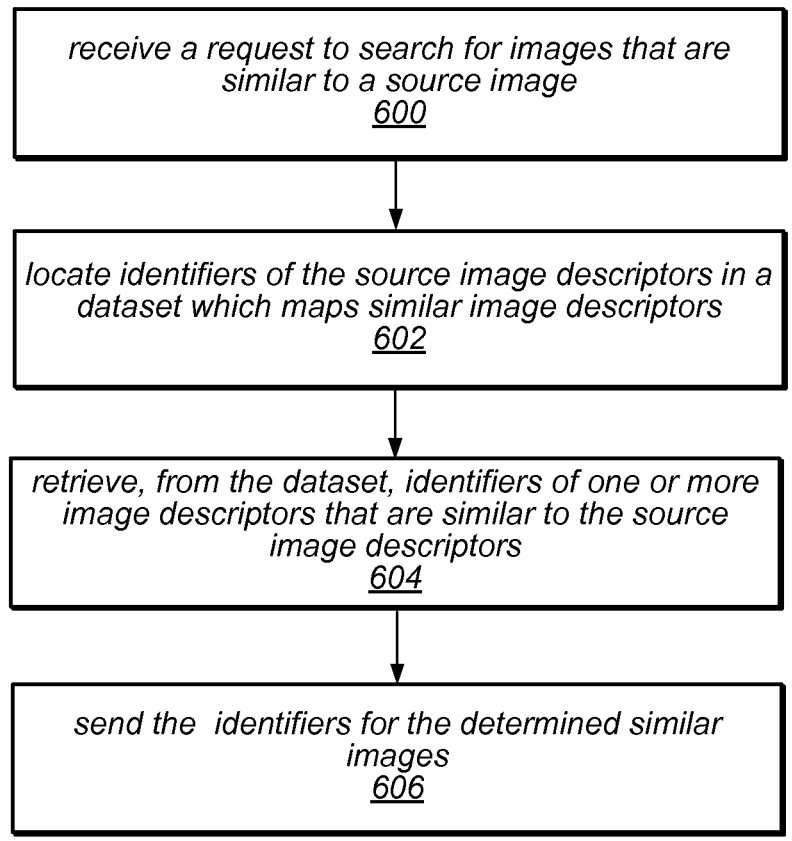
FIG. 6 illustrates an example method for locating similar images within a database, according to some embodiments.

In response to a request from a mobile device user for images which contain content that is similar to image content identified by the mobile device user, such as the request described above in regard to FIG. 5, the image-sharing system may search the real-time image collection for similar images. For example, database 130 may locate images which contain content that is similar to the content designated by the mobile device user. Such images located by database 130 may be referred to herein as similar images. FIG. 6 illustrates a method that may be used by database 130 to locate similar images.

As illustrated at 600, the method illustrated in FIG. 6 may include receiving a request to search for images that are similar to a source image. The request to search for similar images may be, for example, the search request and image descriptor identifiers described above in regard to element 506 of FIG. 5. Database 130 may receive the search request and image descriptor identifiers. The image descriptors, referred to herein as source image descriptors, may represent content in the source image that has been designated by the mobile device user sending the search request. Database 130 may use the source image descriptor identifiers to locate the requested similar images.

As illustrated at 602, the method illustrated in FIG. 6 may include locating the identifiers of the source image descriptors in a dataset which maps similar image descriptors. As described above, the image-sharing system may maintain a data set, such as a nearest neighbors table, which stores information that associates similar images which are stored in database 130. For example, the nearest neighbor table may associate each unique image descriptor identifier with other unique image descriptor identifiers that have been found to contain similar content (using a method such as describe above in regard to FIG. 4). Database 130 may locate the identifiers for the source image descriptors in the nearest neighbor table.

The method illustrated in FIG. 6, at 604, may include retrieving from the dataset, identifiers of one or more image descriptors that are similar to the source image descriptors. Database 130 may retrieve the identifiers of the similar image descriptors from the nearest neighbor table. Since the search for similar image descriptors has been previously performed (as describe above) for all images in database 130, database 130 may only need to look-up the source image descriptors in the nearest neighbor table to locate similar image descriptors. Accordingly, requests for similar images received from mobile device users may be processed with low latency and minimal computation effort. In some embodiments, the nearest neighbor image search of database 130 described above may performed in real-time in response to a mobile device user search request. For example, a user may indicate, for the search, a new source image, that has not yet been stored in database 130. Since the new image has not been stored in database 130, the nearest neighbors may not have been calculated for the new image. The image-sharing system may, in response to the search request, determine the nearest neighbors to the new source image, using a process similar to that described above in regard to FIG. 4. The image-sharing system may then update the nearest neighbor table with an entry for the new image and the determined nearest neighbor images for the new image.

The image sharing system may use the identifiers of the similar image descriptors retrieved at 604 to determine the identifiers for images that are similar to the source image. For example, a portion of the unique identifier for each of the similar image descriptors may indicate the image to which the image descriptor corresponds. In other embodiments, other methods may be used to determine the images which correspond to the similar image descriptors. As indicated at 606 of FIG. 6, the image-sharing system may send the identifiers for the determined similar images to the mobile device. In other embodiments, image files may be sent to the mobile device instead of, or in addition to, the image identifiers. Using the received identifiers, the image-sharing application on the mobile device may display the similar images, or may display thumbnails which represent the similar images.

In some embodiments, the server may be configured to query the nearest neighbor tables of the source descriptor for descriptor matches, as described above. Upon locating matching descriptors, as illustrated in FIG. 4, the server may update the image search and viewing statistics. In some embodiments, the server may also be configured to send ID's of images with matching descriptors to the user's mobile device. These ID's may be used to look up corresponding thumbnail images for display on the user's mobile device. In other embodiments, the server may transmit thumbnails of the matching images for display on the user's mobile device. In some embodiments, images retrieved via search may be used as source images for subsequent searches.

In some embodiments, the image-sharing system may, in real-time, compute statistics for the collection of images. Examples of such statistics may include, but are not limited to the number of images taken during a particular period of time, how many times a particular person or object appears in the images and/or how many images have been taken by a particular user. As another example, the image-sharing system may be configured to enable mobile device users to rank or rate images within the real-time image collection. The image-sharing system may store statistics which indicate how each image in the real-time image collection has been ranked or rated by mobile device users participating in an image-sharing system. In some embodiments, the image-sharing system may compute statistics by tracking various actions which correspond to the images in the real-time image collection. For example, the image-sharing system may track image viewing events (e.g., how many times an image has been viewed by mobile device users), image search events (e.g., how many times images have appeared in search results), or various other events for which statistics may be desired.

The group of mobile device users may receive real-time information based on the statistics computed by the image-sharing system. For example, a particular mobile device user that has captured an image may receive an alert when the captured image is ranked highly by other mobile device users in the image-sharing session. As another example, a mobile device user may receive a notification indicating that they appear in a certain number of images that have been captured during the image-sharing system. In some embodiments, a mobile device user may receive statistics along with images sent to the mobile device user from the server. For example, a mobile device user may receive an image, along with statistics such as: the image contains person A, person A has been photographed N times at this event, and at the time this image was taken, M number of other images were also taken.

Statistics may also be used to provide information to mobile device users regarding their own image capturing activities. For example, a mobile device user may receive statistics indicating the mobile device user is the first mobile device user at an event to take a picture of a particular object. As another example, a mobile device user may receive statistics indicating how many images they have captured, including how many images they have captured of a particular person, object or scene. In some embodiments, mobile device users may be able to specify the image statistics they are interested in receiving and when they'd like to receive them. The mobile device user may specify the image statistics of interest as part of the user preferences that are described above. As an example, a mobile device user may specify, as a user preference, that they would like to receive all captured images from an image-sharing session which receive a top rating from other mobile device users in the image-sharing session.

Example System

Figure 7:
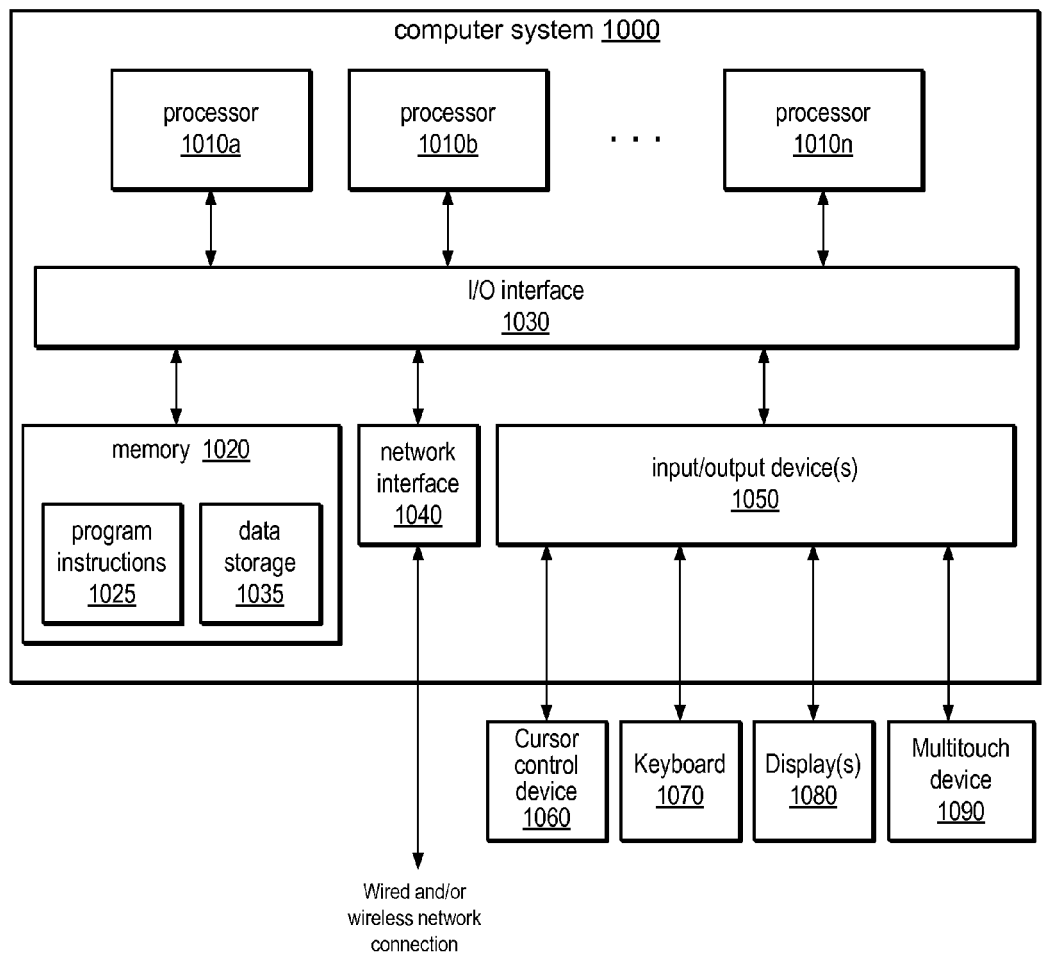
FIG. 7 illustrates an example computer system suitable for implementing various components of the system and method for real-time image collection, according to some embodiments.

Various components of embodiments of methods as illustrated and described in the accompanying description may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, multitouch device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods as illustrated and described in the accompanying description may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those for methods as illustrated and described in the accompanying description, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired and/or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired and/or wireless connection, such as over network interface 1040.

As shown in FIG. 7, memory 1020 may include program instructions 1025, configured to implement embodiments of methods as illustrated and described in the accompanying description, and data storage 1035, comprising various data accessible by program instructions 1025. In one embodiment, program instruction 1025 may include software elements of methods as illustrated and described in the accompanying description. Data storage 1035 may include data that may be used in embodiments. In other embodiments, other or different software elements and/or data may be included.

Those skilled in the art will appreciate that computer system 1000 is merely illustrative and is not intended to limit the scope of methods as illustrated and described in the accompanying description. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc. Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method comprising:
    establishing a session having a predefined amount of time and an associated geographical location;
    receiving a plurality of images from a group of users co-located at the geographical location, the plurality of images captured during the predefined amount of time of the session;
    storing the plurality of images in a database as being associated with the predefined amount of time and the geographical location; and
    sending at least one of the plurality of images to at least one of the users in the group dependent on predetermined user preferences specified by the user, the user preferences involving characteristics of the image that pertain to particular content.

2. The method of claim 1, further comprising:
    for each one of the plurality of received images:
        searching the database for images that are similar to the one of the plurality of received images; and
        storing, in association, with the one of the plurality of received images, one or more identifiers that represent one or more similar images located in said searching, wherein each one of the one or more identifiers represents a corresponding one of the one or more similar existing images.

3. The method of claim 2, wherein said searching comprises:
retrieving, from the database, one or more image descriptors for the one of the plurality of received images;
comparing the one or more retrieved image descriptors to a plurality of image descriptors for the plurality of images stored in the database; and
determining, based on said comparing, one or more images stored in the database that are similar to the one of the plurality of received images.

4. The method of claim 1, further comprising:
receiving a request to search for existing images that are similar to a source image, wherein the request comprises a source image identifier which represents the source image;
locating the source image identifier in a dataset which associates identifiers for similar images;
retrieving, from the dataset, one or more identifiers which represent one or more of the plurality of images in the database that are similar to the source image; and
sending the retrieved one or more identifiers.

5. The method of claim 1, further comprising sending, during the same session, at least one of the plurality of images to at least one user that is not in the group dependent on predetermined user preferences specified by the at least one user.

6. The method of claim 1, further comprising establishing the session of geographically co-located users, wherein said establishing comprises determining that each one of the geographically co-located users is within a particular geographic location.

7. The method of claim 1, further comprising calculating statistics for the plurality of images in the database, wherein the statistics include at least one of a ranking, a rating, or an indication of content for each one of the plurality of images in the database.

8. The method of claim 7, further comprising sending, dependent on the statistics, a notification to at least one user in the group of geographically co-located users, wherein the notification includes information indicated by the statistics.

9. One or more tangible computer-readable storage media comprising instructions stored thereon that, responsive to execution by a computer system, causes the computer system to perform operations comprising:
joining an image-sharing session that is established to have a predefined amount of time, an associated geographical location, and an associated group of users, the image-sharing session established such that images captured by the group of users at the geographical location during the predefined amount of time are shareable between the group;
specifying user preferences of a corresponding said user of the computing device, the user preferences involving characteristics of one or more of the images of the image-sharing session that involve statistical criteria; and
receiving at least one of the plurality of images of the image-sharing session based on the user preferences specified by the user that involve the statistical criteria.

10. One or more tangible computer-readable storage media as described in claim 9, wherein the specifying further comprises selecting a region-of interest of an image.

11. One or more tangible computer-readable storage media as described in claim 10, wherein the selection of the region-of-interest is performed in relation to a display of the image to select the region-of-interest by a touch screen.

12. One or more tangible computer-readable storage media as described in claim 11, wherein the selecting is performed via a tap, circle, or scribble across the region-of-interest.

13. One or more tangible computer-readable storage media as described in claim 9, wherein the specifying is performed to specify metadata associated with one or more of the plurality of images.

14. One or more tangible computer-readable storage media as described in claim 9, wherein the joining is performed responsive to receiving an invitation to join the image-sharing session.

15. A computer system comprising:
a processing system;
a touch screen communicatively coupled to the processing system; and
a memory that is communicatively coupled to the processing system and having instructions stored thereon that, responsive to execution by the processing system, causes operations to be performed comprising:
specifying user preferences via interaction with an image output by a user interface output by the touch screen, the user preferences involving characteristics of the image that pertain to particular content;
communicating the specified user preferences that pertain to the particular content to query a database, the database used as part of an image-sharing session that is established to have a predefined amount of time, an associated geographical location, and an associated group of users, the image-sharing session established such that images captured by the group of users at the geographical location during the predefined amount of time are shareable between the group; and
receiving at least one of the plurality of images of the image-sharing session that pertain to the particular content based on the user preferences.

16. A computer system as described in claim 15, wherein the specifying is performed by selecting a region-of interest of an image.

17. A computer system as described in claim 16, wherein the selection of the region-of-interest is performed in relation to a display of the image to select the region-of-interest by the touch screen.

18. A computer system as described in claim 17, wherein the selecting is performed via a tap, circle, or scribble across the region-of-interest.

19. A computer system as described in claim 15, wherein the specifying further comprises specifying metadata associated with the image.

20. A computer system as described in claim 15, further comprising joining the image sharing session.

* * * * *